(12) United States Patent
Giese et al.

(10) Patent No.: US 9,320,983 B2
(45) Date of Patent: Apr. 26, 2016

(54) VALVE FOR CARRYING OUT A MASS-TRANSFER PROCESS

(71) Applicant: BASF SE, Ludwigshafen (DE)

(72) Inventors: Reiner Giese, Dannenfels (DE); Stefan Haedicke, Bobenheim-Roxheim (DE); Egon Schmidt, Homburg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/202,117

(22) Filed: Mar. 10, 2014

(65) Prior Publication Data

US 2014/0252661 A1 Sep. 11, 2014

Related U.S. Application Data

(60) Provisional application No. 61/775,813, filed on Mar. 11, 2013.

(51) Int. Cl.
*B01D 3/16* (2006.01)

(52) U.S. Cl.
CPC ....................................... *B01D 3/163* (2013.01)

(58) Field of Classification Search
CPC ............................ B01F 3/04829; B01D 3/163
See application file for complete search history.

(56) References Cited

U.S. PATENT DOCUMENTS

| 2,428,889 | A | * | 10/1947 | Nutter | B01D 3/205 261/109 |
| 2,658,737 | A | * | 11/1953 | Nutter | B01D 3/163 137/494 |
| 3,025,041 | A | * | 3/1962 | Sandler | B01D 3/163 202/158 |
| 3,526,385 | A | * | 9/1970 | Rohrer | 251/306 |
| 3,618,913 | A | * | 11/1971 | Schramm | B01D 3/163 261/114.4 |
| 4,305,895 | A | * | 12/1981 | Heath et al. | 261/114.2 |
| 6,221,133 | B1 | * | 4/2001 | Moore | B01D 3/163 261/114.3 |
| 7,267,330 | B1 | * | 9/2007 | Fleming et al. | 261/114.1 |

(Continued)

FOREIGN PATENT DOCUMENTS

| DE | 2848386 A1 * | 5/1980 | B01D 3/163 |
| DE | 2910830 B1 * | 7/1980 | B01D 3/163 |

(Continued)

OTHER PUBLICATIONS

EPO and Google translation of Maleta RU 2 237 508 C1 published Oct. 10, 2004.*

(Continued)

*Primary Examiner* — Amber R Orlando
*Assistant Examiner* — Stephen Hobson
(74) *Attorney, Agent, or Firm* — Oblon, McClelland, Maier & Neustadt, L.L.P (57) ABSTRACT

The invention relates to a valve for carrying out a mass-transfer process in which a gas (13) flows through a liquid (31) standing on an upper tray (21), when the gas supply is interrupted the liquid (31) flows into a lock (17) beneath the tray (21) and, when the gas supply is restarted, the liquid (31) flows out of the lock (17) through a lower tray (19) bordering the lock (17) downward, wherein the valve (1) comprises a closing element (5) which comprises a piston rod (5), an upper valve disk (9) and a lower valve disk (7), and which is conducted in a sleeve (3), wherein the lower valve disk (7), in a first valve position, closes an opening (43) at the lower end of the sleeve (3). The upper valve disk (9) and the lower valve disk (7) are each movably connected to the piston rod (11).

15 Claims, 6 Drawing Sheets

(56) References Cited

U.S. PATENT DOCUMENTS

| | | | |
|---|---|---|---|
| 2009/0200690 A1* | 8/2009 | Maleta et al. | 261/114.4 |
| 2010/0219060 A1* | 9/2010 | Maleta | B01D 3/163 202/158 |
| 2010/0221156 A1* | 9/2010 | Maleta | B01D 3/163 422/607 |
| 2014/0251138 A1* | 9/2014 | Giese | B01D 3/163 95/242 |
| 2014/0252663 A1* | 9/2014 | Giese | B01D 3/30 261/83 |

FOREIGN PATENT DOCUMENTS

| | | | | |
|---|---|---|---|---|
| EP | 2 027 901 A1 | 2/2009 | | |
| EP | 2 033 698 A1 | 3/2009 | | |
| RU | 2 237 508 C1 * | 10/2004 | | |
| UA | WO 2007117227 A1 * | 10/2007 | | B01D 3/163 |
| UA | WO 2007145604 A1 * | 12/2007 | | B01D 3/163 |

OTHER PUBLICATIONS

International Search Report issued May 27, 2014 in PCT/EP2014/054365 (with English translation of category of Cited Documents).

* cited by examiner

VALVE FOR CARRYING OUT A MASS-TRANSFER PROCESS

BACKGROUND

The invention proceeds from a valve for carrying out a mass-transfer process, in which a gas flows through a liquid standing on an upper tray, when the gas supply is interrupted the liquid flows into a lock beneath the upper tray and, when the gas supply is restarted, the liquid flows out of the lock through a lower tray bordering the lock downward, wherein the valve comprises a closing element which comprises a piston rod, an upper valve disk and a lower valve disk and which is conducted in a sleeve, wherein the lower valve disk, in a first valve position, closes an opening at the lower end of the sleeve.

A valve for carrying out a mass-transfer process which is received in a separating tray comprising an upper tray and a lower tray, wherein, between the upper tray and the lower tray, a lock is formed, wherein the valve is designed in such a manner that, in one valve position, gas can flow through the separating tray and is passed through a liquid standing on the upper tray and, when the gas supply is interrupted, the valve, in a second position, ensures that the liquid can flow from the upper tray into the lock, is known for example from EP 2 033 698 A1, EP 2 027 901 A1 or RU 2 237 508 C1. The valves disclosed in these documents each comprise a closing element which comprises two valve disks which are connected to one another via a spacer. In a first position of the closing element, an outlet opening from the valve is closed by the lower valve disk, through which outlet opening the liquid can flow from the lower tray to the separating tray beneath. At the same time, the second valve disk is situated in a position which permits flow of the liquid from the upper tray into the lock. In a second valve position, the closing element is lifted in such a manner that gas can flow through the lower opening in the valve first into the lock and then can flow around the lower valve disk via openings in the valve housing through the lock in the direction of the upper tray, wherein the gas on the upper tray is passed through the liquid standing on the tray.

However, a disadvantage of the valve known from the prior art is that it can become blocked, in such a manner that the liquid does not flow out of the lock when gas supply is restarted or an excessive gas pressure is necessary in order to open the valve. This can lead to an impairment of the separation efficiency.

It is therefore an object of the present invention to provide valves for carrying out a mass-transfer process which function in a fail-safe manner in such a manner that the valves cannot twist and cannot become blocked as a result.

BRIEF SUMMARY

The object is achieved by a valve for carrying out a mass-transfer process in which a gas flows through a liquid standing on an upper tray, when the gas supply is interrupted the liquid flows into a lock beneath the upper tray and, when the gas supply is restarted, the liquid flows out of the lock through a lower tray bordering the lock downward, wherein the valve comprises a closing element which comprises a piston rod, an upper valve disk and a lower valve disk, and which is conducted in a sleeve, wherein the lower valve disk, in a first valve position, closes an opening at the lower end of the sleeve. According to the invention, the upper valve disk and the lower valve disk are each movably connected to the piston rod.

The movable connection of the valve disks to the piston rod ensures a permanent functional reliability of the valve. The movable connection of the valve disk to the piston rod prevents a twisting or sticking and ensures thereby tight and secure closing permanently in operation. The movable connection produces, in addition, automatic centering in the valve housing.

The movable connection of the upper valve disk and the lower valve disk to the piston rod is achieved, for example, by fastening the upper valve disk and the lower valve disk to the piston rod by clamping brackets. Fastening by means of clamping brackets permits an easily implemented connection of valve disk and piston rod without use of complex components.

In one embodiment of the invention, the valve is configured in such a manner that it comprises an upper stop, against which the upper valve disk strikes in a second valve position, wherein the upper stop is arranged below the upper end of the sleeve. The upper stop acts, firstly, in such a manner that in the event of gas flow through the valve, the closing element comprising the two valve disks and the piston rod is not forced out upwards from the sleeve. The arrangement of the upper stop below the upper end of the sleeve, in addition, permits an installation of the valve in such a manner that the upper tray seals flush to the sleeve, in such a manner that in a valve position in which the closing element is in the lower position, all of the liquid can drain off from the upper tray into the lock.

In order to permit passage of gas, in the embodiment in which the upper stop is formed below the upper end of the sleeve in one embodiment outflow openings are formed above the upper stop and overflow openings below the upper stop. The outflow openings and overflow openings are, in addition, enclosed by an overflow chamber in such a manner that, in the second valve position, gas can enter from the valve into the overflow chamber through the overflow openings below the upper stop, and can flow out through the outflow openings from the overflow chamber into the liquid above the upper tray. The gas thus, in operation, flows around the upper valve disk.

In a particularly preferred embodiment, the overflow openings are formed in such a manner that they, together with their upper rim, seal flush to the upper stop. This arrangement of the overflow openings leads to the fact that the upper valve disk is sucked on to the sealing surface thereof formed by the upper stop, which leads to a considerable increase in closing force.

In an alternative embodiment, the upper stop is formed at the upper end of the sleeve and the sleeve is thus positioned in the upper tray in such a manner that it extends through the upper tray. In this embodiment, openings are designed in the sleeve below the upper stop, which openings are positioned above the upper tray. In order to permit complete drainage of liquid from the upper tray, it is further preferred if the lower rim of the openings seals flush to the upper tray. When the closing element is situated in the first, lower valve position, the liquid which stands on the upper tray below the upper end of the sleeve can then flow off through the opening into the lock.

In a preferred embodiment, an upper mounting ring is formed on the sleeve, on which mounting ring, after assembly of valves and trays, the upper tray lies. The mounting ring positions the tray at the correct position with respect to the valve. In a valve in which the sleeve extends beyond the upper tray, the mounting ring is mounted in this case in such a manner that the openings through which the liquid can flow out are situated above the mounting ring and therefore above the upper tray. In this case it is possible to configure the openings in the sleeve in such a manner that the openings end above the mounting ring, in such a manner that the lower rim of the opening lies beneath the upper surface of the upper tray, in such a manner that the lower border of the openings is effectively formed by the tray.

When the valve is configured in such a manner that an overflow channel is provided and the valve sleeve is intended to end flush with the upper tray, it is particularly advantageous to form the upper mounting ring in one-piece with the wall of the overflow channel. In this case, the upper tray then lies on the wall of the overflow channel.

It is additionally advantageous if, on the sleeve, a mounting ring is also formed which, after assembly, lies on the lower tray. This permits the lower tray, the valves and the upper tray to be connected only by placing them one on top of the other or by pushing them into one another, in such a manner that no additional fastening means, for example screws or rivets, for fastening trays and valves, or a connection by welding, are necessary. This permits materials suitable in each case for trays, valves and other components to be used. Thus, for example, different materials can be used for different loads, such as valve disks and sleeve. In order to position the trays and valves in a defined manner to one another, it is, in addition, advantageous when on the upper mounting ring and/or on the lower mounting ring, push-in connectors are formed, in such a manner that the valve is connected via a push-in connection to the upper tray and/or the lower tray. The push-in connection ensures, in particular, that the valve cannot shift in relation to the tray.

In an alternative to the lower mounting ring, it is particularly preferred if, rest lugs are formed on the sleeve, which rest lugs, after assembly of the valve lie on the lower tray. The use of rest lugs instead of the lower mounting ring permits all of the liquid to flow out of the lock into the valve, in order thus to be able to flow out of the lock through the valve on to the tray beneath. If a mounting ring is used, this lies on the lower tray and prevents liquid being able to drain off from the lock up to a height of the mounting ring.

By means of the possibility of being able to connect the upper tray, the lower tray and the intermediate valves to one another by a push-in connection, the properties of the respective individual components are also present in the finished component. In particular, the dimensional and corrosion-resistant properties are not changed.

The individual components of the valve are preferably produced by laser cutting technology or water jet cutting technology. As a result, a thermal or mechanical cutting method can be avoided, whereby the individual components can be deformed. In addition, by means of the laser cutting method or water jet cutting method, the individual component manufacturing accuracy is markedly increased, and dimensional inaccuracies can very largely be avoided. In addition, components which are produced by laser cutting technology or water jet cutting technology are considerably more corrosion resistant, since these parts do not have thermal priority.

In order to avoid twisting and sticking of the closing element, and thus obtain safe and reliable closing permanently in operation, it is further, in particular, preferred when the upper valve disk has a downward-extending rim. The lower valve disk is preferably formed so as to be flat and does not have a corresponding downward- or upward-extending rim.

In running operations, gas flows through a lower opening into the sleeve and thus presses on to the lower valve disk. The closing element is lifted thereby. Above the lower tray, openings are situated in the sleeve, through which openings the gas can enter into the lock. Owing to the pressure rise produced thereby in the lock, the gas reenters the sleeve through openings above the lower valve disk. In this case it is not necessary to provide different openings for exit and entry of the gas, rather it is possible to form, for example, slit-type openings, wherein separation between exit of the gas and entry of the gas is effected by the lower valve disk. In addition to forming openings in the form of slits, it is also possible to perforate the sleeve in any other manner desired, for example by individual circular round openings which are distributed over the periphery of the sleeve.

Owing to the gas entering into the sleeve, a force acts on the upper valve disk, in such a manner that the force which lifts the closing element upwards is further supported thereby. The closing element is pushed against the upper stop by the force exerted by the gas. The gas then exits through the outlet openings in the upper region of the sleeve into the liquid on the upper tray.

When the gas supply is interrupted, a force no longer acts on the closing element, and so this falls downward within the sleeve to a lower stop at the lower end of the sleeve. In this case the lower valve disk comes to lie on the lower stop. The liquid then flows through the sleeve into the lock. After a predetermined time, when all of the liquid has passed from all trays of the column into the respective locks, the gas supply is restarted. A force again acts thereby on the closing element and it is lifted upward. The liquid can now flow out of the lock on to the separating tray beneath against the gas flow through the lower opening of the sleeve.

BRIEF DESCRIPTION OF THE SEVERAL VIEWS OF THE DRAWINGS

Exemplary embodiments of the invention are shown in the figures and are described in more detail in the description hereinafter.

In the drawings.

DETAILED DESCRIPTION

Figure 1:
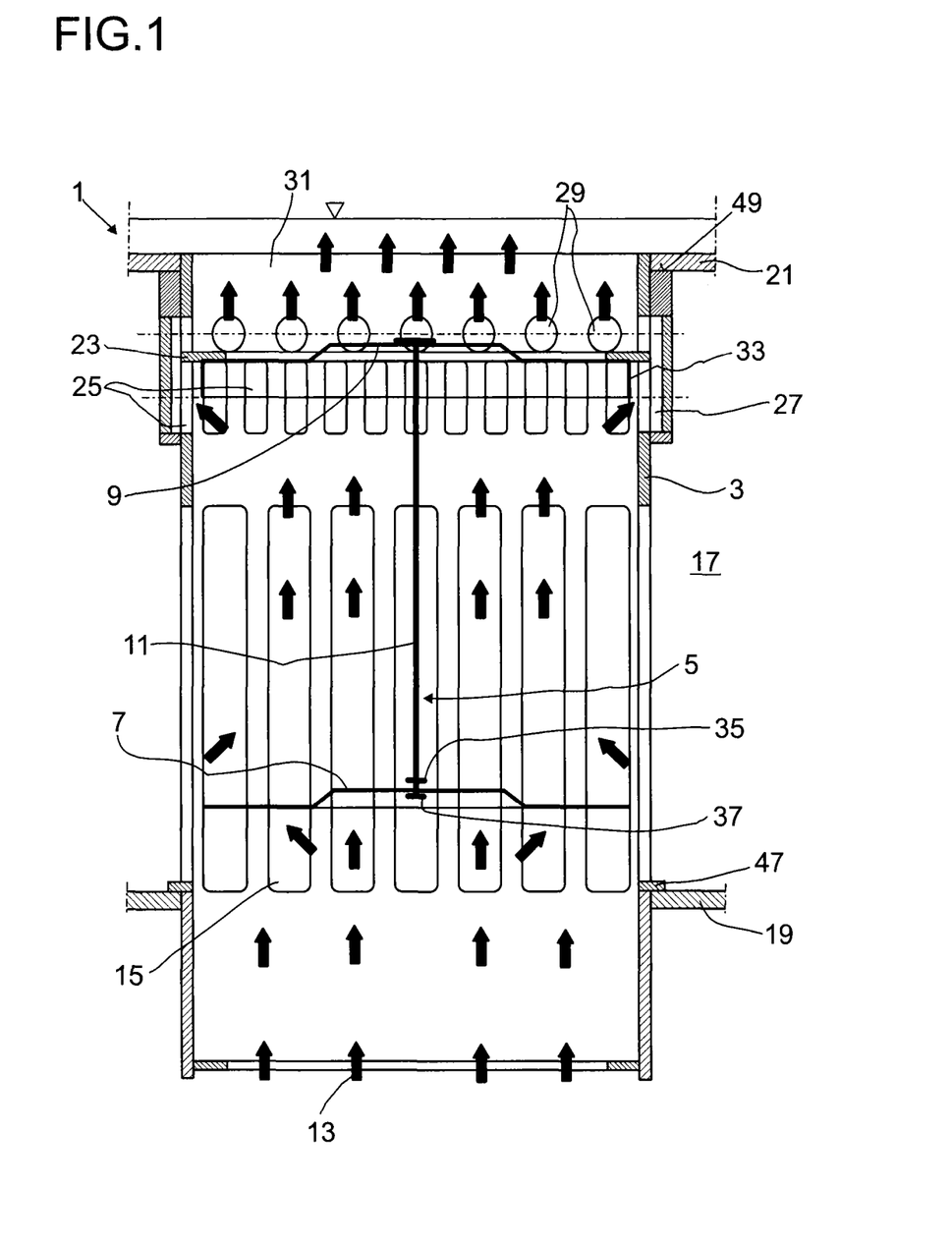
FIG. 1 shows the valve according to the invention with overflow channel during the mass-transfer process.

FIG. 1 shows a valve according to the invention with overflow channel during the mass-transfer process.

A valve 1 comprises a sleeve 3 in which a closing element 5 is movably received. The closing element 5 is composed of a lower valve disk 7, an upper valve disk 9 and a piston rod 11 with which the lower valve disk 7 and the upper valve disk 9 are connected to one another.

The sleeve 3 is open at the lower end thereof, in such a manner that during the mass-transfer process gas can flow into the sleeve 3. This is indicated in FIG. 1 by arrows 13. The inflowing gas 13 presses on to the lower valve disk 7, as a result of which the closing element 5 is lifted.

The gas from the sleeve 3 enters into a lock 17 through openings 15. The lock 17 in this case is bordered by a lower tray 19 and an upper tray 21. In this case the valve 1 in the embodiment shown in FIG. 1 is formed in such a manner that the sleeve 3 projects downward out of the lower tray 19 and seals flush to the upper tray 21.

The openings 15 can be formed so as to be slit-shaped as shown in FIG. 1. In addition to a slit-shaped form of the openings 15, any other desired embodiment of the openings 15 is also possible. Thus, it is, for example, also possible to perforate the sleeve in the region of the lock 17.

Owing to the inflowing gas, the pressure in the lock 17 increases slightly, in such a manner that gas reenters the sleeve 3 through the openings 15 above the lower valve disk 7. The gas reentering the sleeve 3 acts in this case on the upper valve disk 9 and thus supports the lifting of the closing element 5. In order that the closing element 5 is not lifted out of the sleeve 3, an upper stop 23 is received in the sleeve 5, against which stop the closing element 5 is pressed. Below the upper stop 23 there are situated overflow openings 25, through which the gas flows into an overflow channel 27, is deflected therein and, via outflow openings 29, flows into a liquid that stands on the upper tray 21. The overflow openings 25 and the overflow channel 27 are situated in this case above the openings 15.

To avoid twisting of the closing element 5 in the sleeve 3, the lower valve disk 7 and the upper valve disk 9 are designed in a diameter which is smaller than the internal diameter of the sleeve 3. In addition, the upper valve disk 9, in a particularly preferred embodiment that is shown in FIG. 1, has a downward-extending rim 33. In this case, the height of the downward-extending rim 33 is selected in such a manner that, in a position of the upper valve disk 9 at the upper stop 23, at least a part of the overflow openings 25 is still not covered by the downward-extending rim 33.

Furthermore, the lower valve disk 7 and the upper valve disk 9 are movably connected to the piston rod 11. For this purpose it is possible, for example, as shown schematically in FIG. 1 for the lower valve disk 7, to form a stop 35 on the piston rod 11 which stop is positioned above the lower end of the piston rod 11. Below the stop 35 there is then situated the lower valve disk 7 and the lower valve disk 7 is fixed by a further stop 37 at the end of the piston rod. In this case the spacing between the stop 35 and the further stop 37 is greater than the thickness of the lower valve disk 7, and in addition, an opening is received in the lower valve disk 7, the diameter of which opening is greater than the diameter of the piston rod 11. As a result, the lower valve disk 7 can move on the piston rod 11. The upper valve disk 9 is preferably connected in the same manner to the piston rod 11. The stop 35 can be formed, for example, by a ring being mounted on the piston rod 11. Alternatively, it is also possible to compress the piston rod 11, for example, in order to form a corresponding stop. The stop 35 in this case has a diameter which is greater than the diameter of the opening in the lower valve disk 7 through which the piston rod 11 is pushed. The further stop 37 with which the lower valve disk 7 is fixed, can be formed, for example, by clamping brackets.

Figure 2:
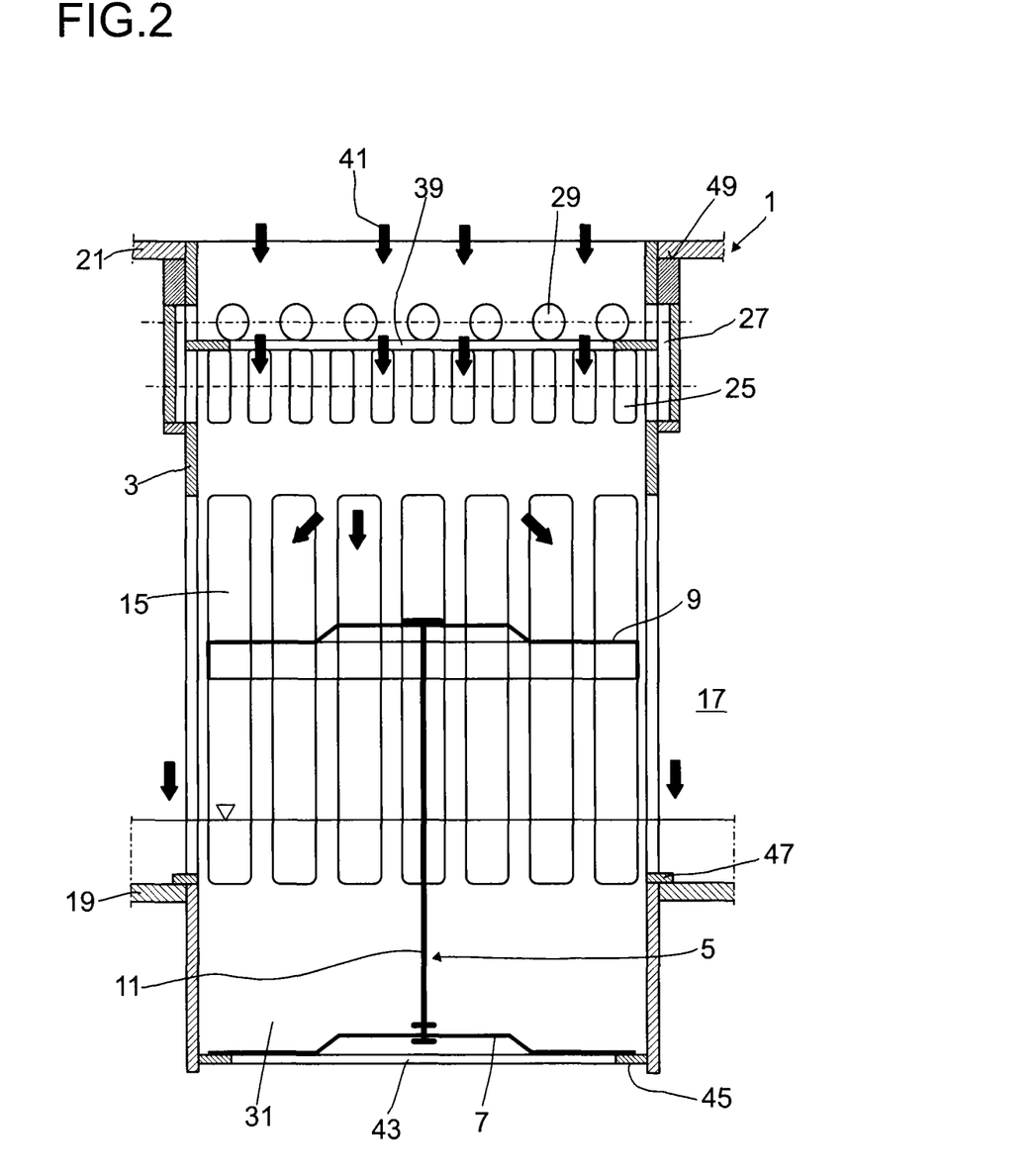
FIG. 2 shows the valve according to the invention with closing elements in a lower valve position with interruption of the gas supply.

When the gas supply is interrupted, that is to say when the mass-transfer process is interrupted, on account of the lack of gas flow, a force no longer acts on the closing element 5, and so it falls into a second lower valve position. This is shown in FIG. 2. Owing to the lack of gas flow and the position of the closing element 5 in the lower valve position, firstly, an upper opening 39 in the sleeve 3 is cleared, and secondly, the flow of the liquid through the outflow opening 29, the overflow channel 27, and the overflow opening 25 is no longer blocked. This leads to the liquid flowing from the upper tray 21, as shown by arrows 41, into the lock 17. At the upper valve disk 9, the liquid is diverted and passed through the openings 15 above the upper valve disk 9 into the lock. Below the upper valve disk 9, the liquid then also flows back into the sleeve 3. The lower valve disk 7, with which the lower opening 43 in the sleeve 3 is closed, prevents an outflow of liquid 31 from the lock 17. In order to seal the lock, the lower valve disk 7 for this purpose lies on a lower stop 45.

Figure 3:
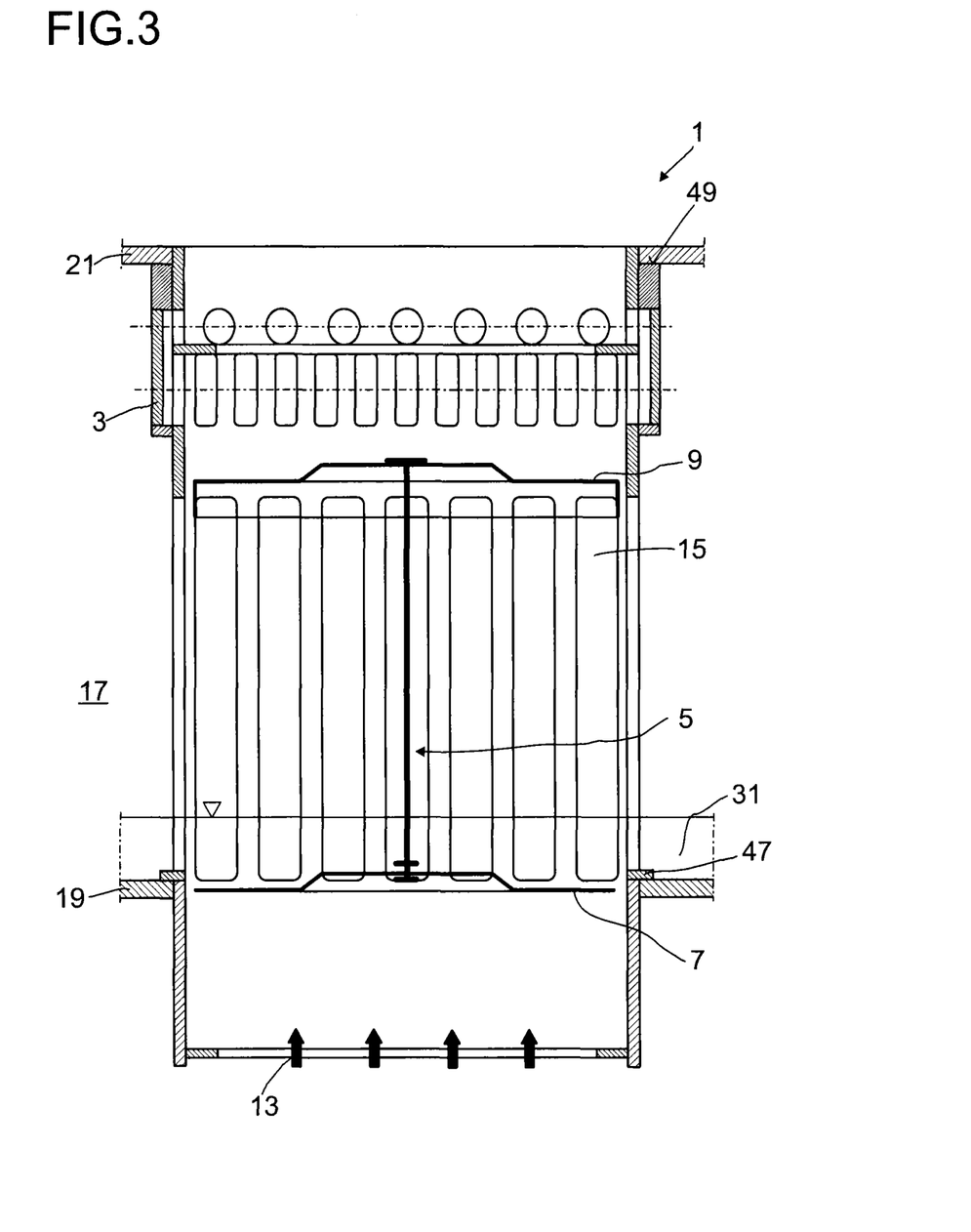
FIG. 3 shows the valve according to the invention when the gas supply is restarted.
Figure 4:
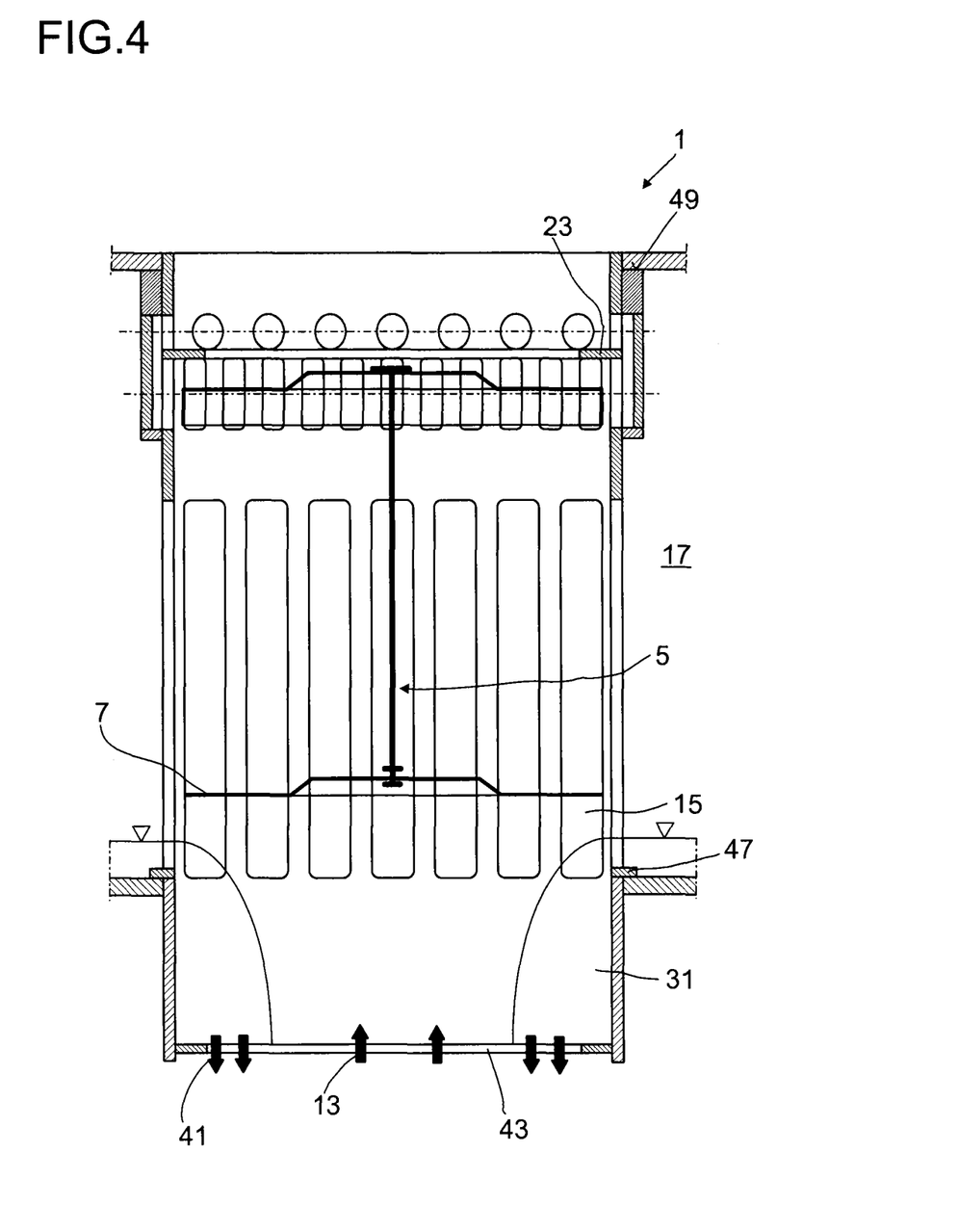
FIG. 4 shows the outflow of liquid from the lock restarting the gas supply.

In running operations, after the liquid has flowed into the lock 17 from all of the separating trays, the gas supply is restarted. Owing to the starting gas supply, the closing element 5 within the sleeve 3 starts to lift. This is shown by way of example in FIG. 3. In this context, first the closing element 5 together with the liquid 31 standing on the lower valve disk 7 is lifted. A small part of the liquid can flow through the gap between lower valve disk 7 and sleeve 3. The gas flow additionally leads to the closing element 5 being further lifted, as shown in FIG. 4. By the further lifting of the closing element 5, the openings 15 below the lower valve disk 7 are cleared, in such a manner that the liquid 31 can flow out unimpeded from the lock 17. At the same time, gas flows in counterflow to the liquid through the lower opening 43 into the sleeve, whereby the closing element 5 is further lifted until it strikes the upper stop 23, as shown in FIG. 1.

In running operations, after a predetermined time, the gas flow is interrupted again, in such a manner that the liquid can flow into the lock and thereafter all of the liquid flows in each case to the separating tray beneath. As a result of this method, a part of the liquid does not flow continuously from one tray to the tray beneath, and so mixing of the liquid within the column for mass transfer does not occur.

Figure 5:
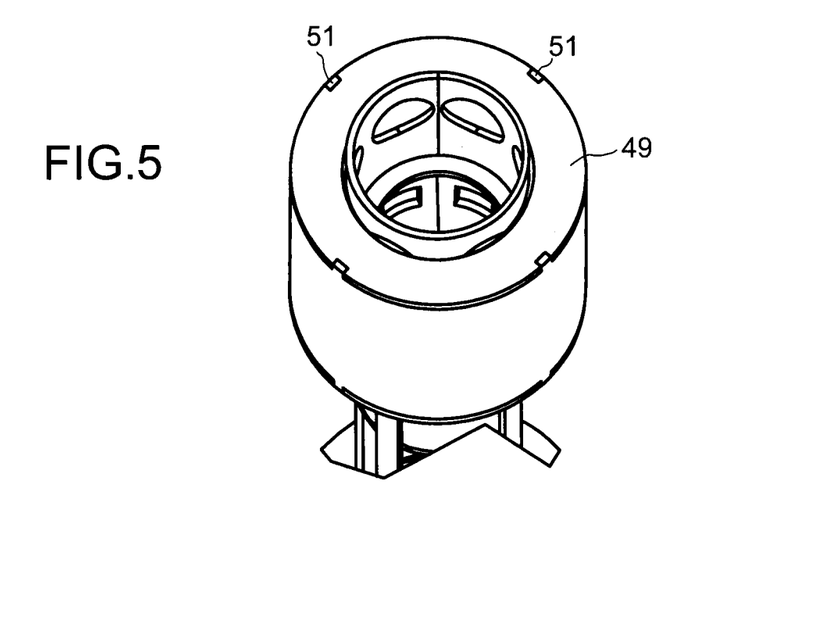
FIG. 5 shows a plan view of a valve according to the invention with push-in connectors at the upper mounting ring.

In FIG. 5 a plan view of a valve according to the invention is shown. In order to obtain mounting as simply as possible, the valve 1 has supporting element 47, as shown in FIGS. 1 to 4. The supporting element 47 can be, for example, a ring, a ring segment or a rest lug. With the support element 47, the valve lies on the lower tray 19. At the upper end of the sleeve 3 there is situated a further mounting ring 49 which, in the embodiment shown in FIGS. 1 to 4, is formed by the upper termination of the overflow channel 27. The upper tray 21 lies on the upper mounting ring 49.

In order to prevent turning and shifting of the valve 1 in the lock, and to obtain a stable connection of the valve 1 to the upper tray 21, push-in connectors 51 are preferably formed on the upper mounting ring 49. The push-in connectors 51 in this case engage into corresponding counter elements on the upper tray 21. A stable connection of the sleeve 3 to the upper tray 21 is achieved thereby. Alternatively, it is also possible to form the push-in connectors on the upper tray 21 and to form the corresponding counter connectors, for example engagement holes, in the upper mounting ring 49.

Figure 6:
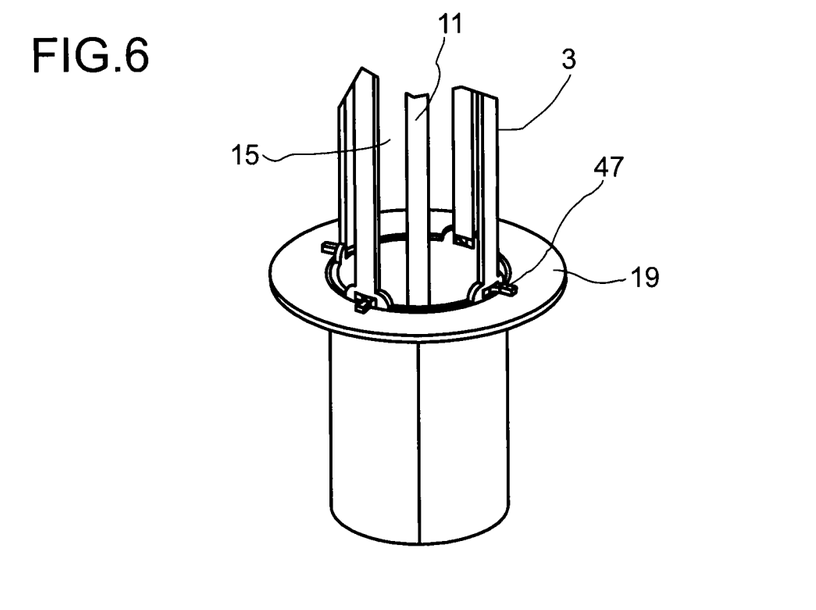
FIG. 6 shows rest lugs on the sleeve for valve mounting.

In order to permit complete outflow of the liquid from the lock 17, it is preferred to configure the supporting elements 47 in the form of rest lugs, as shown in FIG. 6. By means of the configuration as rest lug, the openings 15 in the sleeve 3 are not at least partially covered. The openings can extend to the lower tray 19, and so all of the liquid can flow from the lower tray 19 into the sleeve 3.

In addition to the embodiment shown in FIGS. 1 to 4 with an overflow channel 27, it is also possible to configure the sleeve in such a manner that it projects beyond the upper tray 21. This is shown by way of example in FIG. 7.

Figure 7:
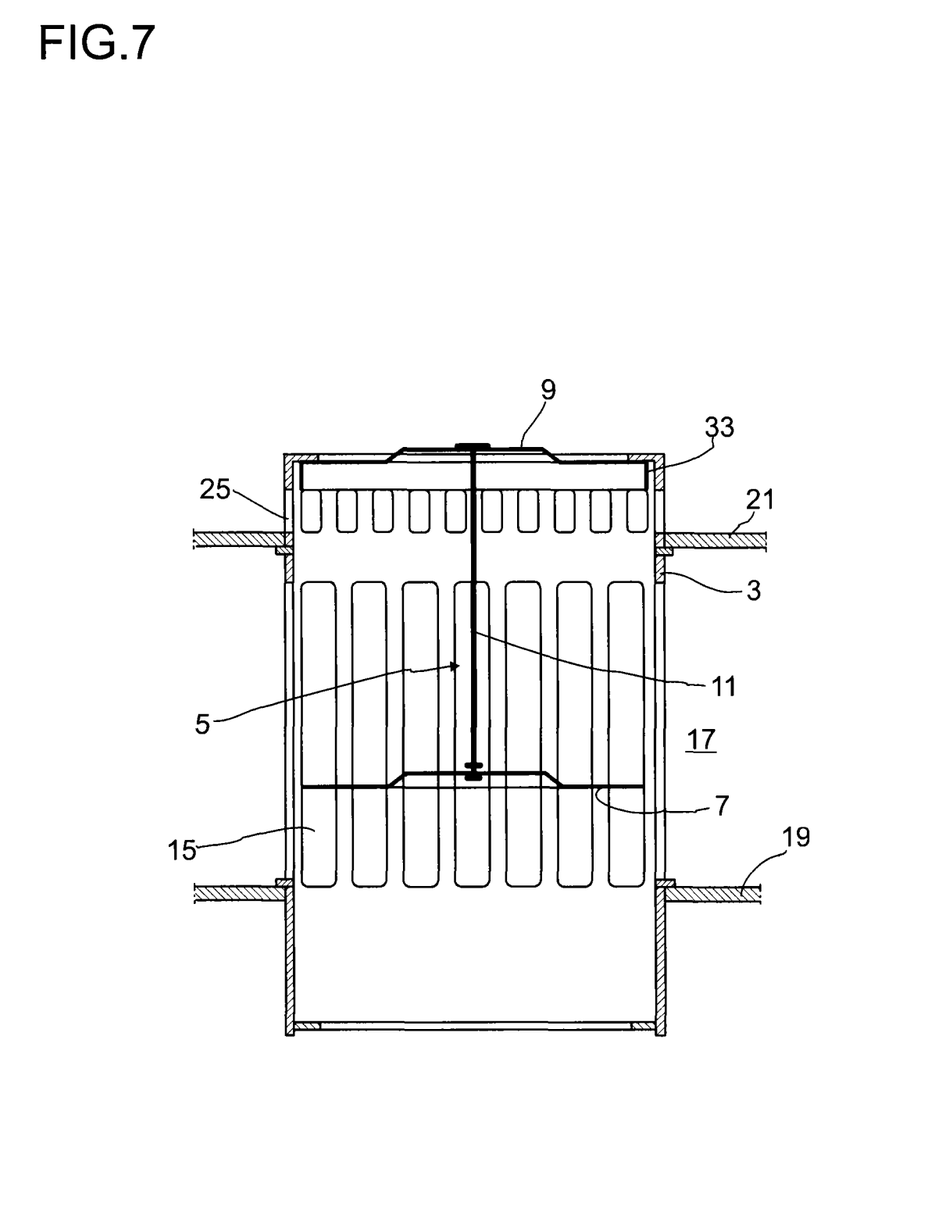
FIG. 7 shows a valve according to the invention in a second embodiment.

In the embodiment shown in FIG. 7, the sleeve is configured in such a manner that it projects beyond the upper tray 21 to the extent that the overflow openings 25 are positioned above the upper tray 21. The gas can thereby flow directly through the overflow openings 25 into the liquid on the upper tray 21. When the gas flow is ended and the closing element 5 is placed in the second, lower valve position, the liquid can then flow through the overflow openings 25 from the upper tray 21 first into the sleeve 3 and then through the openings 15 into the lock 17. The overflow openings 25 in this case are preferably configured in such a manner that the lower edge thereof seals flush to the upper tray 21 in such a manner that all of the liquid can flow from the upper tray 21 into the sleeve 3.

According to the invention, the upper valve disk 9 is also, in the embodiment shown in FIG. 7, formed with a downward-extending rim 33 and the lower valve disk 7 and the upper valve disk 9 are movably connected to the piston rod 11.

LIST OF REFERENCE SIGNS

1 Valve
3 Sleeve
5 Closing element
7 Lower valve disk
9 Upper valve disk
11 Piston rod
13 Gas flow
15 Opening
17 Lock
19 Lower tray
21 Upper tray
23 Upper stop
25 Overflow opening
27 Overflow channel
29 Outflow opening
31 Liquid
33 Downward-extending rim
35 Stop
37 Further stop
39 Upper opening
41 Liquid flow
43 Lower opening
45 Lower stop
47 Supporting element
49 Upper mounting ring
51 Push-in connector

The invention claimed is:

1. A valve for carrying out a mass-transfer process in which a gas flows through a liquid standing on an upper tray, when the gas supply is interrupted the liquid flows into a lock beneath the upper tray and, when the gas supply is restarted, the liquid flows out of the lock through a lower tray bordering the lock downward, wherein the valve comprises a closing element which comprises a piston rod, an upper valve disk and a lower valve disk, and which is conducted in a sleeve, wherein the lower valve disk, in a first valve position, closes an opening at the lower end of the sleeve, wherein the upper valve disk and the lower valve disk are each connected movably with respect to the piston rod.

2. The valve according to claim 1, wherein an upper mounting ring is formed on the sleeve, on which mounting ring, after assembly, the upper tray lies.

3. The valve according to claim 2, wherein, on the sleeve, a lower mounting ring is formed, which mounting ring, after assembly, lies on the lower tray.

4. The valve according to claim 3, wherein, on the upper mounting ring and/or on the lower mounting ring, push-in connectors are formed in such a manner that the valve is connected via a push-in connection to the upper tray and/or lower tray.

5. The valve according to claim 1, wherein an upper stop is comprised, against which the upper valve disk strikes in a second valve position, wherein the upper stop is arranged below the upper end of the sleeve.

6. The valve according to claim 5, wherein, above the upper stop, outflow openings, and below the upper stop, overflow openings are formed in the sleeve, wherein the outflow openings, above the upper stop, and the overflow openings, below the upper stop are enclosed by an overflow channel in such a manner that in the second valve position gas can flow through the overflow openings below the upper stop out of the valve into the overflow channel, and can flow out of the overflow channel through the outflow openings above the upper stop.

7. The valve according to claim 5, wherein a lower boundary of outflow openings in the sleeve are aligned with the upper stop.

8. The valve according to claim 1, wherein the upper valve disk and the lower valve disk are fastened by clamping brackets to the piston rod.

9. The valve according to claim 1, wherein, at the upper end of the sleeve, an upper stop is formed, against which the upper valve disk strikes in a second valve position, and below the upper stop, openings in the sleeve are formed, wherein the openings are dimensioned in such a manner that, after assembly of the valve, they are positioned above the upper tray.

10. The valve according to claim 1, wherein, on the sleeve, a lower mounting ring is formed, which mounting ring, after assembly, lies on the lower tray.

11. The valve according to claim 1, wherein, rest lugs are formed on the sleeve, which rest lugs, after assembly of the valve lie on the lower tray.

12. The valve according to claim 1, wherein the upper valve disk includes a downward-extending rim.

13. The valve according to claim 1, wherein the lower valve disk is formed so as to be flat.

14. The valve according to claim 1, wherein the sleeve together with openings formed therein, the upper valve disk, the lower valve disk and/or the piston rod are fabricated at least in part by laser cutting technology or by water jet cutting technology.

15. A valve for carrying out a mass-transfer process in which a gas flows through a liquid standing on an upper tray, when the gas supply is interrupted the liquid flows into a lock beneath the upper tray and, when the gas supply is restarted, the liquid flows out of the lock through a lower tray bordering the lock downward, wherein the valve comprises a closing element which comprises a piston rod, an upper valve disk and a lower valve disk, and which is conducted in a sleeve, wherein the lower valve disk, in a first valve position, closes an opening at the lower end of the sleeve, wherein the upper valve disk and the lower valve disk are each movably connected to the piston rod, wherein the upper valve disk includes a downward-extending rim.

* * * * *